United States Patent
Mishra et al.

(10) Patent No.: US 12,353,448 B2
(45) Date of Patent: Jul. 8, 2025

(54) CONSTRUCTING AND EXECUTING SEARCH QUERIES WITH TERMS SEMANTICALLY SIMILAR TO THOSE OF A SEARCH REQUEST

(71) Applicant: Dell Products L.P., Round Rock, TX (US)

(72) Inventors: Abhishek Mishra, Bangalore (IN); Vivek Bhargava, Bangalore (IN); Vaideeswaran Ganesan, Bengaluru (IN); Rishav Sethia, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 293 days.

(21) Appl. No.: 18/114,467

(22) Filed: Feb. 27, 2023

(65) Prior Publication Data
US 2024/0289358 A1    Aug. 29, 2024

(51) Int. Cl.
*G06F 40/30* (2020.01)
*G06F 16/332* (2019.01)
(Continued)

(52) U.S. Cl.
CPC ...... *G06F 16/3325* (2019.01); *G06F 16/3334* (2019.01); *G06F 40/247* (2020.01); *G06F 40/30* (2020.01)

(58) Field of Classification Search
CPC ...... G06F 40/30; G06F 40/247; G06F 40/295; G06F 40/284; G06F 40/35; G06F 40/289; G06F 40/279; G06F 40/237; G06F 40/205; G06F 40/216; G06F 40/211; G06F 16/248; G06F 16/2425; G06F 16/3325;
(Continued)

(56) References Cited

U.S. PATENT DOCUMENTS 9,542,476 B1 *   1/2017   Allon ................. G06F 16/3326
11,216,511 B1 *  1/2022   Bigdelu .............. G06F 16/248
(Continued)

OTHER PUBLICATIONS

J. Rygl et al., "Semantic Vector Encoding and Similarity Search Using Fulltext Search Engines," Proceedings of the 2nd Workshop on Representation Learning for NLP, Aug. 3, 2017, pp. 81-90.
(Continued)

*Primary Examiner* — Vijay B Chawan
(74) *Attorney, Agent, or Firm* — Ryan, Mason & Lewis, LLP

(57) ABSTRACT

An apparatus comprises a processing device configured to receive and parse a search request related to a given event to identify confident terms, and to determine a first subset of the confident terms which indirectly reference the given event and a second subset of the confident terms which are not in the first subset. The processing device is also configured to identify, for a given confident term in the second subset, terms having at least a threshold level of semantic similarity with the given confident term, and to construct a primary search query comprising the first and second subsets of the confident terms and additional search queries comprising the first subset of the confident terms and the identified one or more terms having at least the threshold level of semantic similarity with the given confident term. The processing device is further configured to execute the primary and additional search queries.

20 Claims, 7 Drawing Sheets

(51) Int. Cl.
*G06F 16/3332* (2025.01)
*G06F 40/247* (2020.01)

(58) Field of Classification Search
CPC ............ G06F 16/3344; G06F 16/3334; G06F 16/3331; G06F 16/9038; G06F 16/338
USPC ............................................................. 704/9
See application file for complete search history.

(56) References Cited

U.S. PATENT DOCUMENTS

| | | | | |
|---|---|---|---|---|
| 11,507,572 | B2* | 11/2022 | Robert Jose | G06F 16/24522 |
| 11,636,128 | B1* | 4/2023 | Bigdelu | G06F 16/2428 |
| | | | | 707/722 |
| 11,644,955 | B1* | 5/2023 | Singamneni | G06F 3/0481 |
| | | | | 707/722 |
| 12,124,485 | B2* | 10/2024 | Xu | G06N 5/022 |
| 2015/0161202 | A1* | 6/2015 | Shapira | G06F 16/235 |
| | | | | 707/723 |
| 2017/0364805 | A1* | 12/2017 | Boyer | G06F 16/3329 |
| 2017/0364806 | A1* | 12/2017 | Boyer | G06F 16/3329 |
| 2018/0330231 | A1* | 11/2018 | Gu | G06N 3/08 |
| 2019/0034540 | A1* | 1/2019 | Perkins | G06F 16/9535 |
| 2022/0100741 | A1* | 3/2022 | Robert Jose | G06F 16/287 |
| 2022/0188306 | A1* | 6/2022 | Bigdelu | G06F 16/252 |
| 2023/0031327 | A1* | 2/2023 | Bourbie | G06F 16/90324 |
| 2024/0289358 | A1* | 8/2024 | Mishra | G06F 16/3334 |

OTHER PUBLICATIONS

Dell Technologies, "Dell CloudIQ: A Detailed Review, A Proactive Monitoring and Analytics Application for the Dell Environment," White Paper H15691.7, Jan. 2023, 189 pages.

Dell Technologies, "Apex," https://www.delltechnologies.com/asset/en-my/solutions/apex/briefs-summaries/apex-brochure.pdf, Nov. 2022, 10 pages.

* cited by examiner

CONSTRUCTING AND EXECUTING SEARCH QUERIES WITH TERMS SEMANTICALLY SIMILAR TO THOSE OF A SEARCH REQUEST

FIELD

The field relates generally to information processing, and more particularly to search processing in information processing systems.

BACKGROUND

As the value and use of information continues to increase, individuals and businesses seek additional ways to process and store information. Information handling systems may be used to process, compile, store and communicate various types of information. Because technology and information handling needs and requirements vary between different users or applications, information handling systems may also vary (e.g., in what information is handled, how the information is handled, how much information is processed, stored, or communicated, how quickly and efficiently the information may be processed, stored, or communicated, etc.). Information handling systems may be configured as general purpose, or as special purpose configured for one or more specific users or use cases (e.g., financial transaction processing, airline reservations, enterprise data storage, global communications, etc.). Information handling systems may include a variety of hardware and software components that may be configured to process, store, and communicate information and may include one or more computer systems, data storage systems, and networking systems. Various search algorithms may be used for searching the information stored in information handling systems.

SUMMARY

Illustrative embodiments of the present disclosure provide techniques for constructing and executing search queries with terms semantically similar to those of a search request.

In one embodiment, an apparatus comprises at least one processing device comprising a processor coupled to a memory. The at least one processing device is configured to receive a search request related to a given event, to parse the search request to identify a set of confident terms in the search request having at least a threshold level of definiteness, and to determine first and second subsets of the set of confident terms, the first subset of the set of confident terms comprising confident terms which indirectly reference the given event, the second subset of the set of confident terms comprising confident terms not in the first subset of the set of confident terms. The at least one processing device is also configured to identify, for at least a given one of the confident terms in the second subset, one or more terms having at least a threshold level of semantic similarity with the given confident term, and to construct a primary search query and one or more additional search queries, the primary search query comprising the first and second subsets of the set of confident terms, the one or more additional search queries comprising the first subset of the set of confident terms and the identified one or more terms having at least the threshold level of semantic similarity with the given confident term. The at least one processing device is further configured to execute the primary and one or more additional search queries to obtain a primary result set and one or more additional result sets, and to return a response to the search request, the response comprising at least a subset of results in the primary result set and at least a subset of results in the one or more additional result sets.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
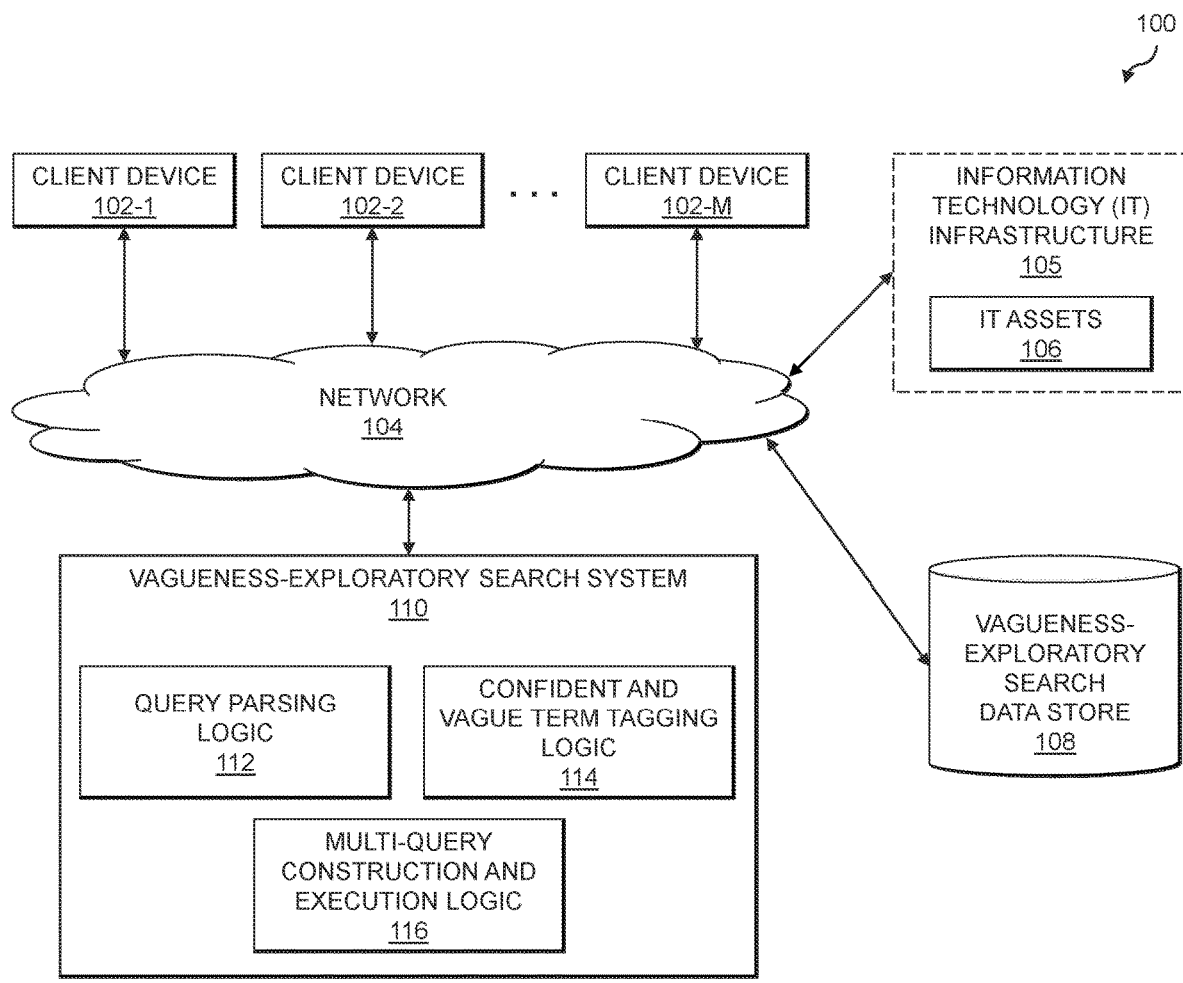
FIG. 1 is a block diagram of an information processing system configured for constructing and executing search queries with terms semantically similar to those of a search request in an illustrative embodiment.

FIG. 1 shows an information processing system 100 configured in accordance with an illustrative embodiment. The information processing system 100 is assumed to be built on at least one processing platform and provides functionality for vagueness-exploratory searching. The system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a vagueness-exploratory search data store 108, and a vagueness-exploratory search system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the vagueness-exploratory search system 110 is used for an enterprise system. For example, an enterprise may subscribe to or otherwise utilize the vagueness-exploratory search system 110 for performing searches within data storage provided by the IT assets 106 of the IT infrastructure 105. The IT assets 106 of the IT infrastructure 105 may or may not be under the control of the enterprise system. Users of the enterprise system associated with the client devices 102 (or potentially other ones of the IT assets 106 of the IT infrastructure 105) can utilize the vagueness-exploratory search system 110 in order to perform searches with "vague" terms.

As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The vagueness-exploratory search data store 108, as discussed above, is configured to store and record various information that is used by the vagueness-exploratory search system 110 for performing vagueness-exploratory searches. Such information may include, but is not limited to, information regarding terms which are "confident" or "vague" as well as information regarding terms which are associated with a location, time or person. The vagueness-exploratory search data store 108 in some embodiments is implemented using one or more storage systems or devices associated with the vagueness-exploratory search system 110. In some embodiments, one or more of the storage systems utilized to implement the vagueness-exploratory search data store 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the vagueness-exploratory search system 110, as well as to support communication between the vagueness-exploratory search system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., including performing servicing, configuration or other management of the IT assets 106, or of applications or other software that runs on the IT assets 106). For example, a given one of the client devices 102 may be operated by a user to access a graphical user interface (GUI) provided by the vagueness-exploratory search system 110 to perform vagueness-exploratory searches to data stored on the IT assets 106 of the IT infrastructure 105. The vagueness-exploratory search system 110 may be provided as a cloud service that is accessible by the given client device 102 to allow the user thereof to perform vagueness-exploratory searches. In some embodiments, the IT assets 106 of the IT infrastructure 105 are owned or operated by the same enterprise that operates the vagueness-exploratory search system 110 (e.g., where an enterprise such as a business provides support for the assets it operates). In other embodiments, the IT assets 106 of the IT infrastructure 105 may be owned or operated by one or more enterprises different than the enterprise which operates the vagueness-exploratory search system 110. Various other examples are possible.

In some embodiments, the client devices 102 and/or IT assets 106 may implement host agents that are configured for automated transmission of information (e.g., in the form of computer-generated notifications) to and from the client devices 102 as part of vagueness-exploratory search queries. It should be noted that a "host agent" as this term is generally used herein may comprise an automated entity, such as a software entity running on a processing device. Accordingly, a host agent need not be a human entity.

The vagueness-exploratory search system 110 in the FIG. 1 embodiment is assumed to be implemented using at least one processing device. Each such processing device generally comprises at least one processor and an associated memory, and implements one or more functional modules or logic for controlling certain features of the vagueness-exploratory search system 110. In the FIG. 1 embodiment, the vagueness-exploratory search system 110 comprises query parsing logic 112, confident and vague term tagging logic 114, and multi-query construction and execution logic 116. The query parsing logic 112 is configured to receive and parse queries which are received from the client devices 102 utilizing natural language processing (NLP) techniques to isolated different terms in input queries. The confident and vague term tagging logic 114 is configured to identify particular terms in input queries which are confident and vague. The multi-query construction and execution logic 116 is configured to utilize information from the vagueness-exploratory search data store 108 to identify semantically similar terms for the confident tagged terms, and to construct multiple queries using such identified semantically similar terms which are then executed (e.g., using one or more search engines) against available data storage (e.g., of the IT assets 106 of the IT infrastructure 105).

It is to be appreciated that the particular arrangement of the client devices 102, the IT infrastructure 105 and the vagueness-exploratory search system 110 illustrated in the FIG. 1 embodiment is presented by way of example only, and alternative arrangements can be used in other embodiments. As discussed above, for example, the vagueness-exploratory search system 110 (or portions of components thereof, such as one or more of the query parsing logic 112, the confident and vague term tagging logic 114, and the multi-query construction and execution logic 116) may in some embodiments be implemented internal to one or more of the client devices 102 and/or the IT infrastructure 105.

At least portions of the query parsing logic 112, the confident and vague term tagging logic 114, and the multi-query construction and execution logic 116 may be implemented at least in part in the form of software that is stored in memory and executed by a processor.

The vagueness-exploratory search system 110 and other portions of the system 100, as will be described in further detail below, may be part of cloud infrastructure.

The vagueness-exploratory search system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the vagueness-exploratory search data store 108 and the vagueness-exploratory search system 110 or components thereof (e.g., the query parsing logic 112, the confident and vague term tagging logic 114, and the multi-query construction and execution logic 116) may be implemented on respective distinct processing platforms, although numerous other arrangements are possible. For example, in some embodiments at least portions of the vagueness-exploratory search system 110 and one or more of the client devices 102, the IT infrastructure 105 and/or the vagueness-exploratory search data store 108 are implemented on the same processing platform. A given client device (e.g., 102-1) can therefore be implemented at least in part within at least one processing platform that implements at least a portion of the vagueness-exploratory search system 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the IT infrastructure 105, IT assets 106, the vagueness-exploratory search data store 108 and the vagueness-exploratory search system 110, or portions or components thereof, to reside in different data centers. Numerous other distributed implementations are possible. The vagueness-exploratory search system 110 can also be implemented in a distributed manner across multiple data centers.

Additional examples of processing platforms utilized to implement the vagueness-exploratory search system 110 and other components of the system 100 in illustrative embodiments will be described in more detail below in conjunction with FIGS. 6 and 7.

It is to be appreciated that these and other features of illustrative embodiments are presented by way of example only, and should not be construed as limiting in any way.

It is to be understood that the particular set of elements shown in FIG. 1 for vagueness-exploratory searching is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for constructing and executing search queries with terms semantically similar to those of a search request will now be described in more detail with reference to the flow diagram of FIG. 2. It is to be understood that this particular process is only an example, and that additional or alternative processes for constructing and executing search queries with terms semantically similar to those of a search request may be used in other embodiments.

In this embodiment, the process includes steps 200 through 212. These steps are assumed to be performed by the vagueness-exploratory search system 110 utilizing the query parsing logic 112, the confident and vague term tagging logic 114, and the multi-query construction and execution logic 116. The process begins with step 200, receiving a search request related to a given event. In step 202, the search request is parsed to identify a set of confident terms in the search request having at least a threshold level of definiteness. Step 202 may include identifying one or more vague terms in the search request, the one or more vague terms comprising uncountable or doubtful pronouns, verbs, nouns and adverbs, and identifying remaining terms in the search request as the set of confident terms. Step 202 may include utilizing a confident terms data store associated with a user submitting the search request. The confident terms data store may be built through analyzing one or more social media data sources, one or more employment data sources, and one or more calendar data sources associated with the user submitting the search request. The confident terms data store may also or alternatively be built through monitoring one or more chat logs of one or more chats involving the user submitting the search request.

In step 204, first and second subsets of the set of confident terms are determined. The first subset of the set of confident terms comprise confident terms which indirectly reference the given event, and the second subset of the set of confident terms comprise confident terms not in the first subset of the set of confident terms. The first subset of the set of confident terms which indirectly reference the given event may comprise at least one of: one or more location terms comprising one or more locations associated with the given event; one or more time terms comprising one or more times associated with the given event; and one or more person terms comprising one or more persons associated with the given event.

Figure 2:
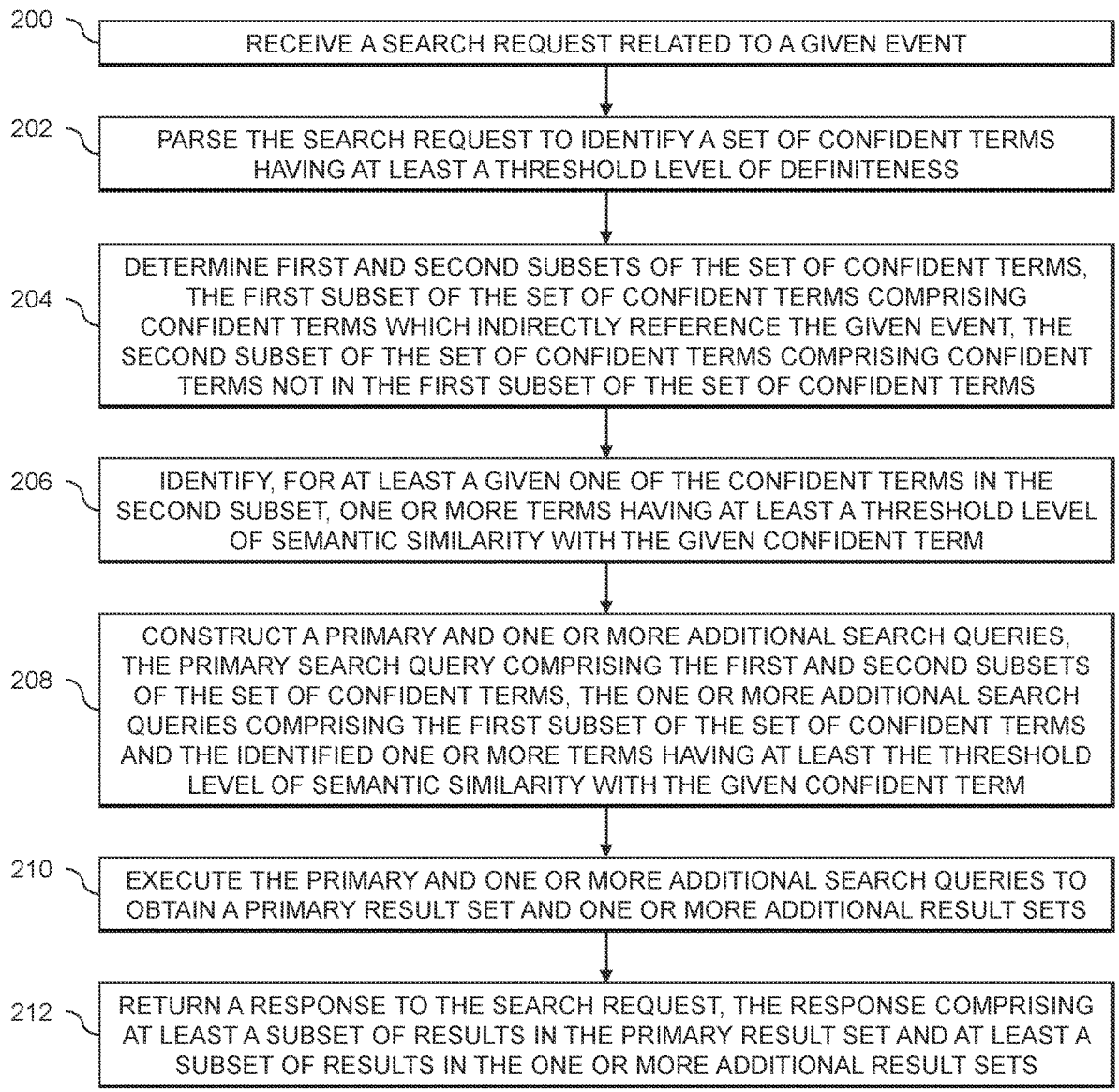
FIG. 2 is a flow diagram of an exemplary process for constructing and executing search queries with terms semantically similar to those of a search request in an illustrative embodiment.

The FIG. 2 process continues with step 206, identifying, for at least a given one of the confident terms in the second subset, one or more terms having at least a threshold level of semantic similarity with the given confident term. Step 206 may comprise determining one or more synonyms for the given confident term in a word thesaurus data store. The word thesaurus data store may be built utilizing one or more thesaurus data sources and one or more disambiguation data sources.

A primary search query and one or more additional search queries are constructed in step 208. The primary search query comprises the first and second subsets of the set of confident terms. The one or more additional search queries comprise the first subset of the set of confident terms and the identified one or more terms having at least the threshold level of semantic similarity with the given confident term. Step 208 may comprise converting at least one of the confident terms in the first subset of the set of confident terms into a fixed query by looking up the at least one confident term in one or more knowledge systems associated with a user submitting the search request. The one or more knowledge systems may comprise at least one of a social media network and an address book. Converting the at least one confident term into the fixed query may comprise determining a possible range of values for the at least one confident term from information stored in the one or more knowledge systems associated with the user submitting the search request.

The primary and one or more additional search queries are executed in step 210 to obtain a primary result set and one or more additional result sets. In step 212, a response to the search request is returned. The response comprises at least a subset of results in the primary result set and at least a subset of results in the one or more additional result sets. In some embodiments, step 206 comprises assigning a term ranking to each of the one or more terms having at least the threshold level of semantic similarity with the given confident term, the rankings characterizing a degree of closeness to the given confident term. A given one of the one or more additional search queries is assigned an overall ranking based at least in part on a combined ranking of the identified one or more terms having at least the threshold level of semantic similarity with the given confident term which are included in the given additional search query. The FIG. 2 process may further comprise, responsive to detecting that a user selects one or more of the results in a given one of the additional result sets corresponding to the given additional search query, to update at least one of (i) the overall ranking of the given additional search query and (ii) the term rankings of the identified one or more terms having at least the threshold level of semantic similarity with the given confident term which are included in the given additional search query.

Search algorithms may be built on top of several aspects, including natural language processing (NLP), translation, known numerical aspects, etc. Techniques from NLP (e.g., stemming), translation (e.g., the same keyword in different languages, etc.) and numerical translations (e.g., length in miles versus kilometers, measuring in units such as liters, cubic centimeters (cc), pints, pounds (lb), etc.) are used extensively to retrieve relevant search results. Additionally, similarity criteria may be applied to bring in additional documents or other search results with similar content.

In many cases, however, a user may only have a vague idea of what they are looking for. Thus, the user needs to spend several hours searching and narrowing down results to a result set of interest. Given the vast indexes and the content aggregation that has already happened, a next step is to provide users with tools that help them to arrive at their results much faster even when they only have a vague idea about what they are looking for. In illustrative embodiments, the technical solutions provide tools for vagueness-exploratory search mechanisms. In a vagueness-exploratory search, a goal is to provide a search query methodology that would consider the vagueness of the input query and try to arrive at a result set that is very close to what the user is searching for. Many times a user has only a vague idea about what they are looking for. Eventually, through several searches the user can narrow down to the content that the user is looking for. The technical solutions described herein enable a vagueness-exploratory search which simplifies this "journey" and gets the user closer to the content they are looking for faster.

The technical solutions described herein cover various aspects of vagueness, including where a user remembers details with a specific reference (e.g., a birthday, vacation, product release, etc.) while vaguely remembering the content, context or information that needs to be searched. The technical solutions provide a way to use that reference (e.g., the birthday, vacation, product release, etc.) and convert it into nominal data that can be fed into query processors. Some example situations of vagueness include: (1) a user remembering sending an email to a particular product vendor around someone's birthday two to three years ago; (2) a user remembering that a similar issue surfaced when the user was on a long vacation, and remembering that the issue had something to do with a storage array device; (3) a user forgetting an insurance identification (ID), but remembering it was at the time when the user had a major surgery and it was in some mail that was related to getting insurance coverage for the surgery; (4) a user remembering reading somewhere about an early warning system in storage devices, but not remembering a uniform resource locator (URL); (5) a user wanting to find a medicine which a close friend was using and shared with the user over an email or chat; (6) a user remembering some sequence of additional steps needed for rolling back specific software which was detailed in an email or document about two years back; (7) a user remembering hearing about a requirement or solution discussed in an online forum some weeks back, and that the user was part of a meeting where the requirement or solution must be in the minutes of the meeting or a recording thereof; (8) a user remembering that there is a specific brand for which people buy clothes while visiting a store, so in order to check the size or design from previous history the user can do a search in a kiosk of the store to guide the user to a right segment of the store; etc.

Vector and semantic searches have various limitations. Vector and semantic searches, for example, may be used to search based on the intended meaning of the user to provide results as understood by the user. However, these vectors are limited by the corpus from which the semantics have been derived, and do not really cover the entire range of the meanings they offer. A thesaurus or an encyclopedia (e.g., Wikipedia) may provide a wide range of usages of terms (e.g., with different confidence levels) and including those meanings enables users to have perspectives outside the scope defined by the vectors. Consider, for example, a vector search for "Italian restaurant" which could reveal not just Italian restaurants but also pizza places. If a thesaurus/encyclopedia were looked at, however, some additional terms related to "Italian" may be returned such as Provenance, Continental, Latin, etc. A vector search does not return these words, and hence would potentially exclude restaurants that are related to these cuisines. As another example, a user can search for something generic like "shoes" or "black shoes," or potentially something more precise like a particular brand and model shoe. In this case, "black shoes" may be treated very differently from other shoes. If a thesaurus/encyclopedia were looked at, however, some additional or related terms such as sneakers, slippers, footgear, flip-flops, golf shoes, work shoes, platform shoes, etc. may be returned providing a much wider scope of interpretation of the term. Thus, use of the thesaurus/encyclopedia increases the exposure of the user to more different aspects of terms. As a further example, a search for "insurance" would return results related to various types of insurance (e.g., home, auto, etc.). If a thesaurus/encyclopedia were looked at, however, additional terms such as guarantee, warranty, safeguard, indemnity (e.g., with different confidence levels) may be returned to cover different aspects of the same search term. As a further example, a user may search for "rice" which may return results related to cereals, Rice University/Research Institute, etc. If a thesaurus/encyclopedia were looked at, however, additional personages, music, novels, buildings etc. that use the name "rice" may be returned, such as RICE chemotherapy cancer medicine.

Vagueness-exploratory search may be used to go beyond the well-known meaning of input search terms. Vector searches and other semantic search mechanisms are limited by the corpus from which the semantics have been derived, and thus search results are driven only by these meanings. A thesaurus/encyclopedia, on the other hand, provides graded meanings of all potential usages of the search terms enabling a wider exposure to the user. The user can thus be exposed to unimagined or broader usages of the terms, rather than being restricted or restrained by their search engine knowledge. In a way, this could help reduce bias and enable users to explore beyond their known meaning.

The technical solutions described herein enable vagueness-exploratory search. In a vagueness-exploratory search, the user may have a vague idea, but there may be some elements where there is some confidence. In the above examples, terms like birthday, two to three years ago, long vacation, storage array device, mail to product vendor, insurance ID, some mail, get insurance money, major surgery, early warning system, storage devices, etc. have a degree of certainty. While the user does not have exact details (e.g., actual dates, actual persons, actual subject of mails, actual titles of topics, which insurance or insurance ID was being used, etc.), the terms are good enough data for narrowing down search elements. The user may not remember actual terms properly, and may remember semantic meanings only. For example, the actual term the user is looking for may be "predictive failure," whereas the user remembers it as "early warning system." These are not similar linguistically, but semantically they are similar. Similarly, "get insurance money" is semantically but not linguistically similar to "claims submission." Vagueness indicators (e.g., somewhere, something, etc.) provide additional information in terms of where the vagueness is. For example, somewhere indicates time or location, something indicates an object, etc. The result is the object or aspect that is being searched. In the above examples, the objects include mail sent to product vendor, past issues like the current issue, insurance ID, and URL.

Humans do not always remember an exact or even approximate date and time, but may link the date and time to events or partial data (e.g., the month or year). If an exact or approximate date and/or time is available, it can be easily used to create a simple search query. But because of the inexact nature of the human mind remembering context, a vague query search must be performed. The vague query search converts this vagueness into a search radius by deriving the dates linked to these events.

Vector searches and other semantic search technology are also limited by the corpus from which the semantics have been derived. Hence, search results are only driven by these meanings. A thesaurus/encyclopedia, on the other hand, provides graded meanings of all potential usages of the terms enabling a wider exposure to the user. The user can thus be exposed to unimagined or broader usages of the terms rather than being restricted or restrained by their search engine knowledge.

The technical solutions described herein provide a vagueness-exploratory search mechanism that isolates these and other aspects to create search queries that are more appropriate for the situation. The vagueness-exploratory search mechanism is configured: to isolate the different terms in the query (e.g., by removing and splicing them into simpler phrases); to identify the confident parameters (e.g., by looking at those aspects where there are definitive terms such as proper nouns, common nouns, abstract nouns, verbs, etc.); to identify the vagueness parameters (e.g., by looking at aspects like "something" and "somewhere" which are classified as uncountable or doubtful pronouns, verbs, nouns, adverbs, etc.); to identify if there are any semantically similar terms (e.g., by searching through domain dictionaries, a thesaurus/encyclopedia, etc. to try to identify documents that have semantically similar terms); and to construct a query syntax that incorporates all of the above and executes it on the available data storages or search engines. In some embodiments, NLP approaches are leveraged.

Figure 3:
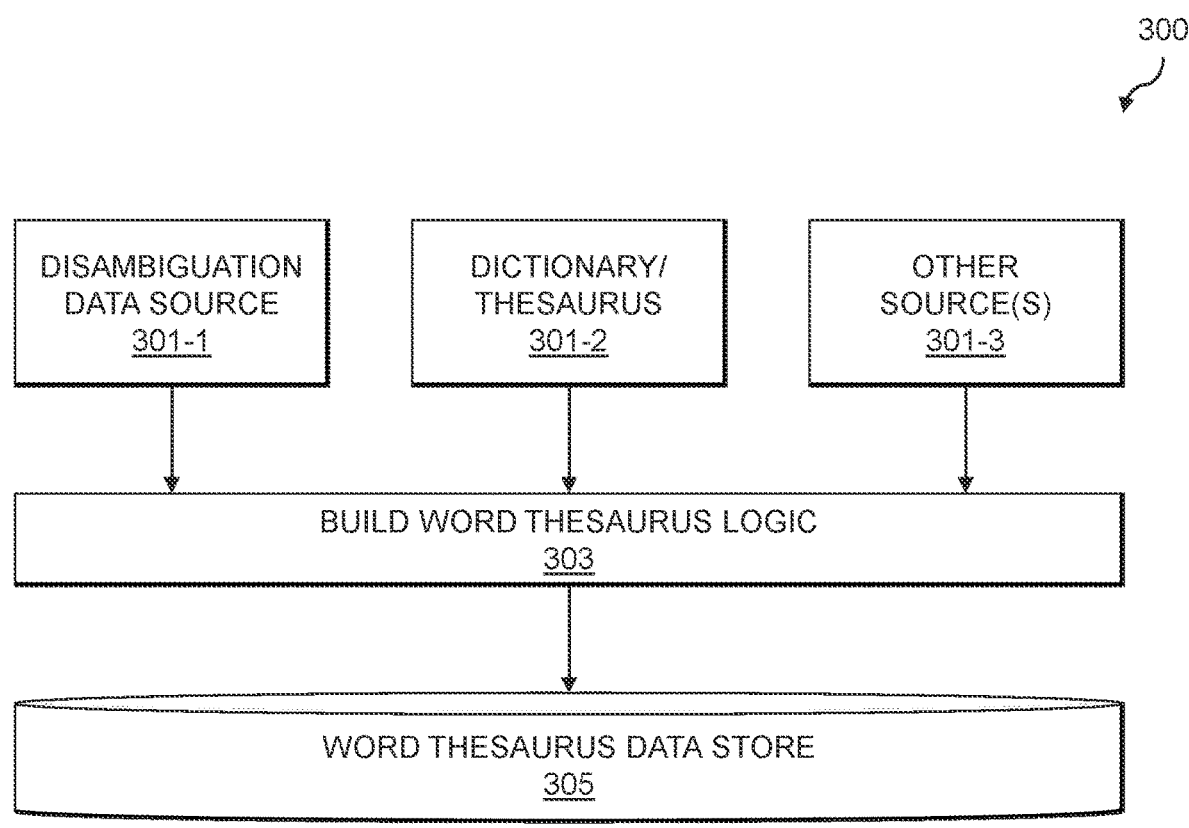
FIG. 3 shows a process flow for building a word thesaurus data store in an illustrative embodiment.

FIG. 3 shows a system flow 300 for building a word thesaurus data store 305 that covers various representations of the words, such as by leveraging the content from various data sources including a disambiguation data source 301-1 (e.g., Wikipedia disambiguation pages), a dictionary and/or thesaurus 301-2 (e.g., including an online thesaurus), as well as various other sources 301-3. The data sources 301-1, 301-2 and 301-2 (collectively, data sources 301) are used by build word thesaurus logic 303 to build a list of words and their corresponding meanings or forms for storage in the word thesaurus data store 305. For example, the word "rice" may be mapped to cereal, persons, universities/schools, music albums, movies, etc. Traditional search engines, for example, may not return music albums, people and movies for the search term rice. A rank for each meaning is based on the rank associated or defined by the dictionary/thesaurus 301-2. In the case where the dictionary/thesaurus 301-2 does not have the meaning, a minimum threshold rank may be associated. The dictionary/thesaurus 301-2 provides a ranking of synonyms (e.g., thesaurus.com utilizes relative coloring, with stronger meanings having bolder colors and less frequent usages having lighter colors). Such rankings are transferred to the words. The word thesaurus data store 305 provides a holistic usage model across all possible usages (e.g., rather than the word usage patterns that are built using the corpus of search engines). The build word thesaurus logic 303 is configured to build the word thesaurus data store 305 to cover various representations of words, leveraging content from the various data sources 301. The rank for each term is based on rankings obtained from the dictionary/thesaurus 301-2 (e.g., which provides synonym ranking). The build word thesaurus logic 303 provides a holistic usage model across all possible usages of words.

Figure 4:
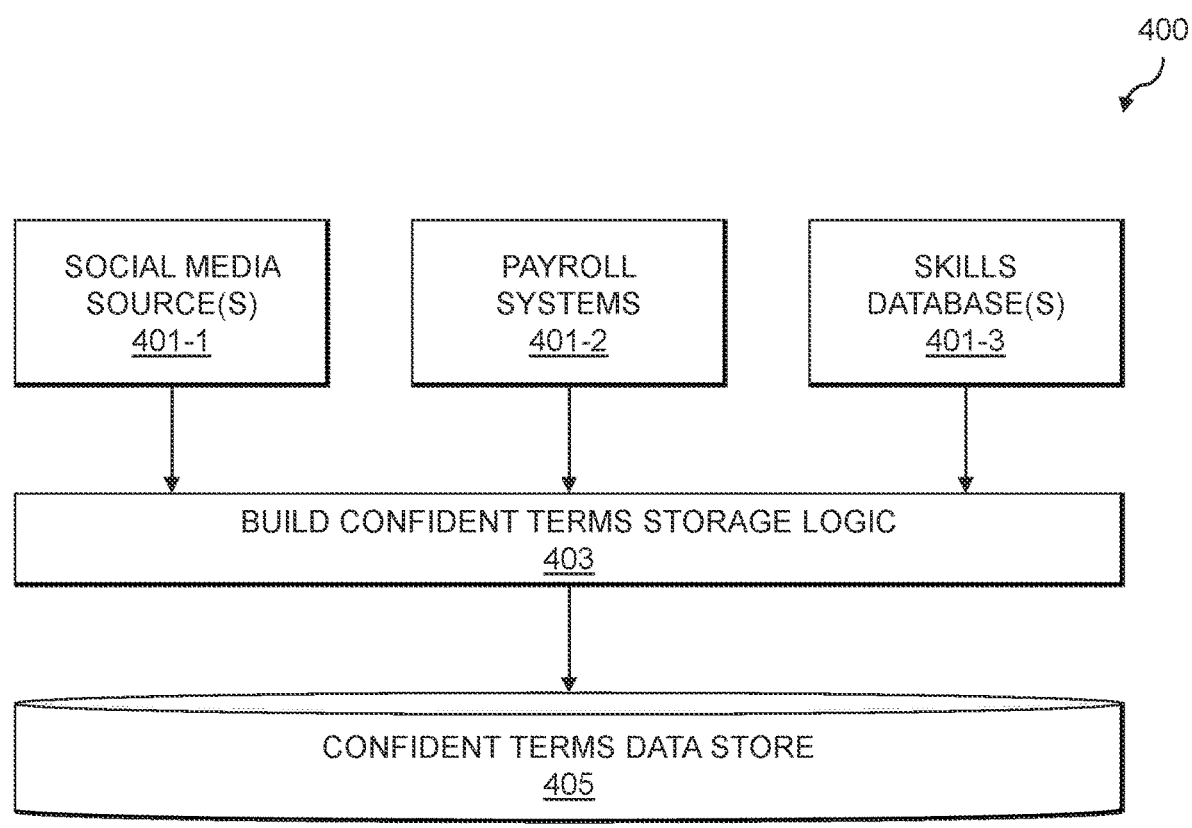
FIG. 4 shows a process flow for building a confident terms data store in an illustrative embodiment.

FIG. 4 shows a system flow 400 for building a confident terms data store 405, such as by leveraging the content from various data sources including social media sources 401-1, payroll systems 401-2 and skills databases 401-3. The data sources 401-1, 401-2 and 401-3 (collectively, data sources 401) are used by build confident terms storage logic 403 to build an indicative term storage within the customer premises equipment or mobile devices. The build confident terms storage logic 403 will scan conversations or other information from the data sources 401 for event references, and maintain them in the confident terms data store 405 to provide personalized insights for translating confident relative term queries. The vagueness-exploratory search may involve a user that remembers events, persons or locations in reference to an indirect event. The confident terms data store 405 is built using metadata from the various data sources 401, and artificial intelligence (AI)/machine learning (ML) approaches may be used to monitor "chats" or other information from the data sources 401 to capture and store certain terms in the confident terms data store 405 (e.g., "Happy Birthday XYZ!", "I am on vacation", etc.).

Figure 5:
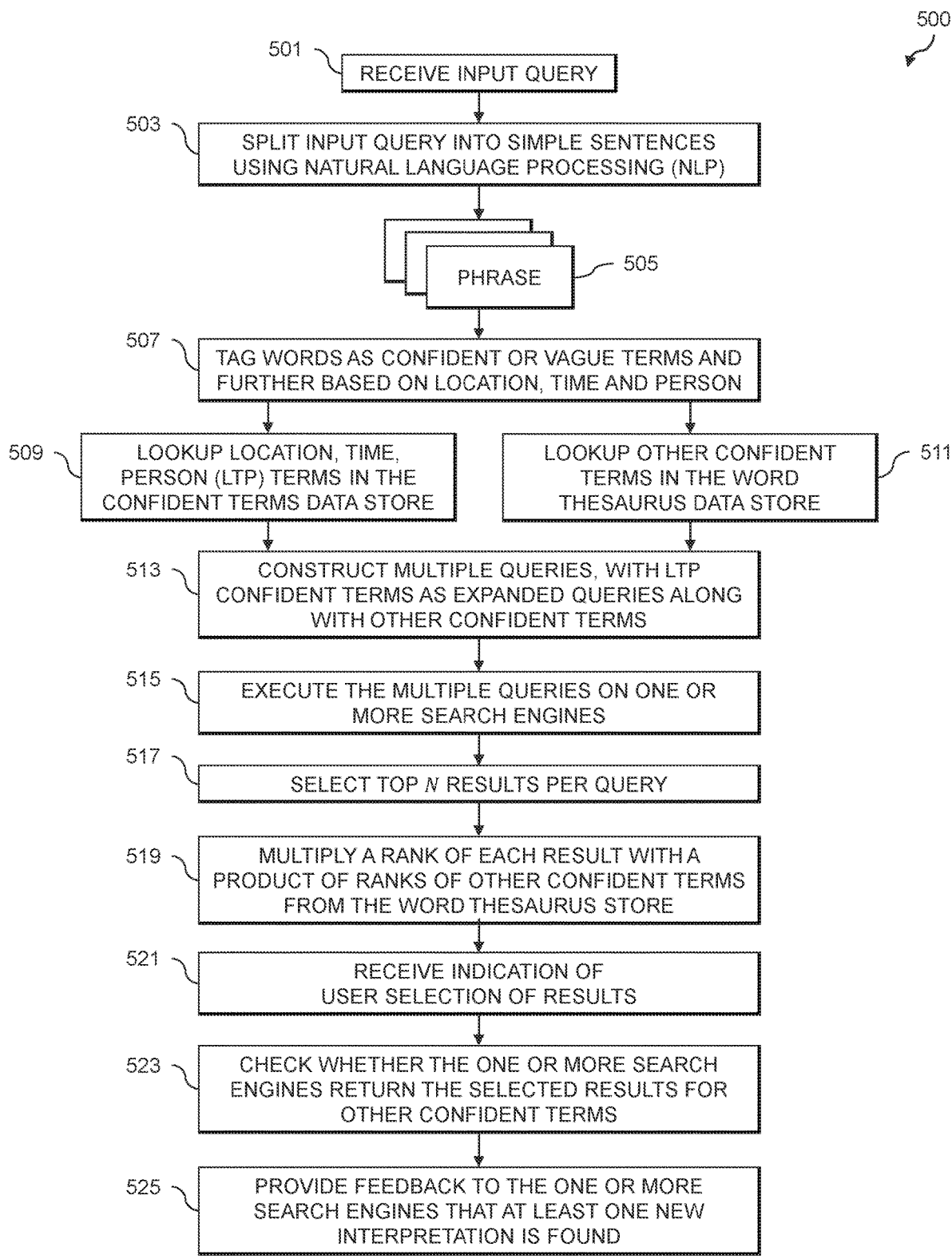
FIG. 5 shows a process flow for query handling utilizing the word thesaurus data store and the confident terms data store in an illustrative embodiment.

FIG. 5 shows a process flow 500 for performing a vagueness-exploratory search utilizing the word thesaurus data store 305 and the confident terms data store 405. In step 501, a query is input for a vagueness-exploratory search. In step 503, the input query is split into certain logical terms (e.g., simple sentences) after stemming using NLP techniques. Terms are isolated by grouping all the adjectives to the noun they qualify, and adverbs to the verb they qualify. Groups are then reduced by removing one keyword at a time. Complex statements are thus dealt with by splitting them on their conjunctions (e.g., if, but, when, and, or, but also, therefore, nevertheless, etc.). The individual statements are then split for phrases, gerunds, etc. Finally, the group of phrases are further reduced to split the nouns and verbs separately as discussed above. The result is a set of phrases 505 referred to as reduced terms. In step 507, the phrases 505 are analyzed to tag words as "confident" or "vague" terms, and further to characterize location, time and person (LTP) terms. Result terms are identified by identifying the "objects" (e.g., in language terms as in subject-verb-object) in the sentences, where the object is the target of the verb/action performed by the subject/user. The word tagging in step 507 includes taking words that are uncountable or vague as "vague" terms. Examples of vague terms include somebody, somewhere, anybody, something, like, etc. Terms which are not vague are tagged as confident. "Time" terms are related to time events (e.g., birthday, vacation, surgery, etc.), while "location" terms are related to a place (e.g., place, website, company, hotel, etc.) and "person" terms are related to persons (e.g., friend, relative, colleague, etc.).

The "confident" terms are then constructed as a query, which involves a query processor tapping into corresponding knowledge systems. Social networks, for example, may be used to look up birthdays, friendships, etc. Payroll systems may be used to look up vacation times, skills databases or workday tools may be used to look up technical expertise information, etc. Since the "confident" terms may themselves contain vague terms (e.g., like someone's birthday), the query process will convert the query into an appropriate fixed query. Continuing with the example of someone's birthday, this may be converted to "<data_term_being_searched_for> in <list of all birthdays>". A "long" vacation could be any vacation greater than some designated threshold number of days (e.g., 3 days) as defined in payroll dictionaries and hence the range of days with more than the designated threshold number of vacation days will be considered as the range of dates to be queried, etc. Similarly, based on whether a person is a colleague, a friend, a contractor, etc., names may be fetched from an address book, social media networks, internal contract systems, etc. There are various ways in which LTP terms are used, and they may be looked up in various systems using the confident terms data store 405 in step 509 to form a primary query. Confident terms which are not LTP terms are then looked up in the word thesaurus data store 305 in step 511, which gives not only the meanings but also semantically close meanings. For example, an "early warning" may mean a "prediction" with a rank of 0.7. The word thesaurus data store 305 may assign some ranks in terms of degree of closeness. The reduced terms in the primary query that do not belong to LTP terms can thus be replaced in the primary query with the "thesaurus" selected terms from the word thesaurus data store 305 to form secondary queries. The secondary queries are given the combined rank of the all the thesaurus ranks (e.g., obtained from the word thesaurus data store 305) of the reduced terms. In this way, multiple queries are constructed in step 513 using the information obtained from the confident terms data store 405 and the word thesaurus data store 305 in steps 509 and 511, respectively.

In step 515, the multiple queries are run on one or more search engines or against data storage. In step 517, a top N (e.g., 5) results per query are selected. A rank of each of the selected results is determined in step 519 as a product of the ranks of the other confident terms in the results from the word thesaurus data store 305. This is used to sort the results provided to the user (e.g., in accordance with relevance of the input vagueness-exploratory search query from step 501), and the user can select results in step 521. The user can then refine the initial search or query as needed. The FIG. 5 process flow 500 also includes learning functionality. When the user selects the results in step 521, a check is performed in step 523 as to whether one or more of the search engines return the selected results for the other confident terms (e.g., results coming from the word thesaurus data store 305 and not from general search engine results). This is used in step 525 to provide feedback to the one or more search engines that new interpretations are found (e.g., new synonyms coming from the word thesaurus data store 305), which can update vectors used by the one or more search engines with the new synonyms and word associations.

The technical solutions described herein provide a number of technical advantages, including the ability to classify vague terms and use them in search languages as well as the ability to accept LTP terms in terms of vague ranges rather than just specific values (e.g., like someone's birthday, etc.). Further, the technical solutions described herein have the ability to classify terms based on confidence and use them in search queries. The technical solutions are able to convert a search query into multiple queries which use other terms (e.g., not just the terms used by the user in the input query) that are semantically close terms by leveraging a word thesaurus data store. Ranks are attached based on the closeness provided using the word thesaurus data store. In some embodiments, relevance rankings are provided across various sub-search queries that have semantically similar meaning. While vector searches provide some information related to how users think, vector searches are still limited to the synonyms/word associations that are derived from an available corpus from which the vector searches have been computed. The technical solutions described herein provide a more holistic synonym view of the words used in queries, and thus enables users to see beyond the most common interpretations of the words. With the integration of thesaurus/encyclopedia data sources, users are exposed to a larger range of possible meanings of terms and are not just limited to those meaning that vector searches have learnt. This provides an alternative to majority bias, enabling users to see holistic yet relevant usages. The technical solutions described herein enable an enterprise to improve the productivity of its employees that use its applications (e.g., including Dell Communique). The technical solutions can also be deployed in cloud-based systems (e.g., Dell Apex, CloudIQ, etc.) that provide cloud-based support to engineers and other users in data centers.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for constructing and executing search queries with terms semantically similar to those of a search request will now be described in greater detail with reference to FIGS. 6 and 7. Although described in the context of system 100, these platforms may also be used to implement at least portions of other information processing systems in other embodiments.

Figure 6:
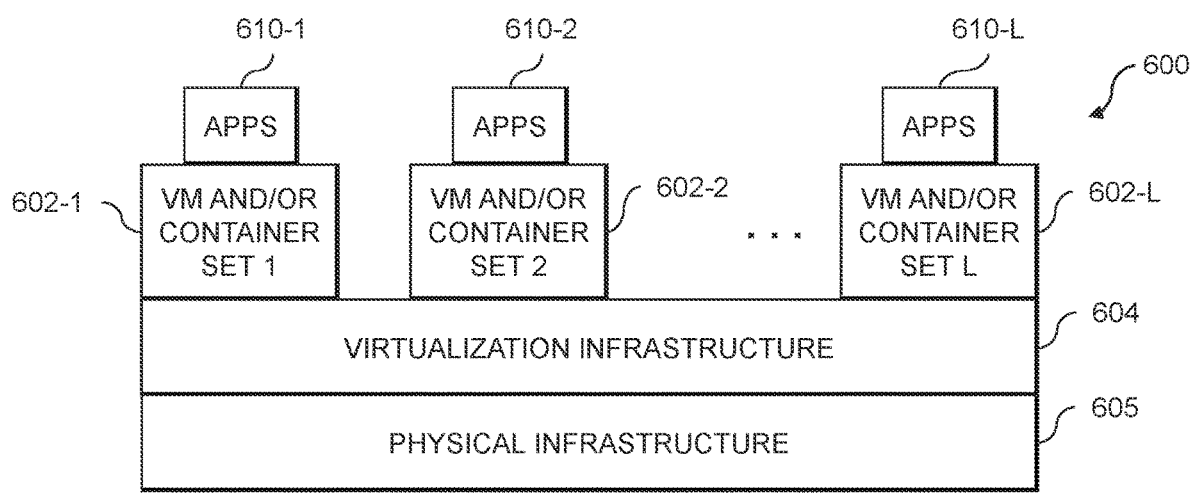
FIGS. 6 and 7 show examples of processing platforms that may be utilized to implement at least a portion of an information processing system in illustrative embodiments.
Figure 7:
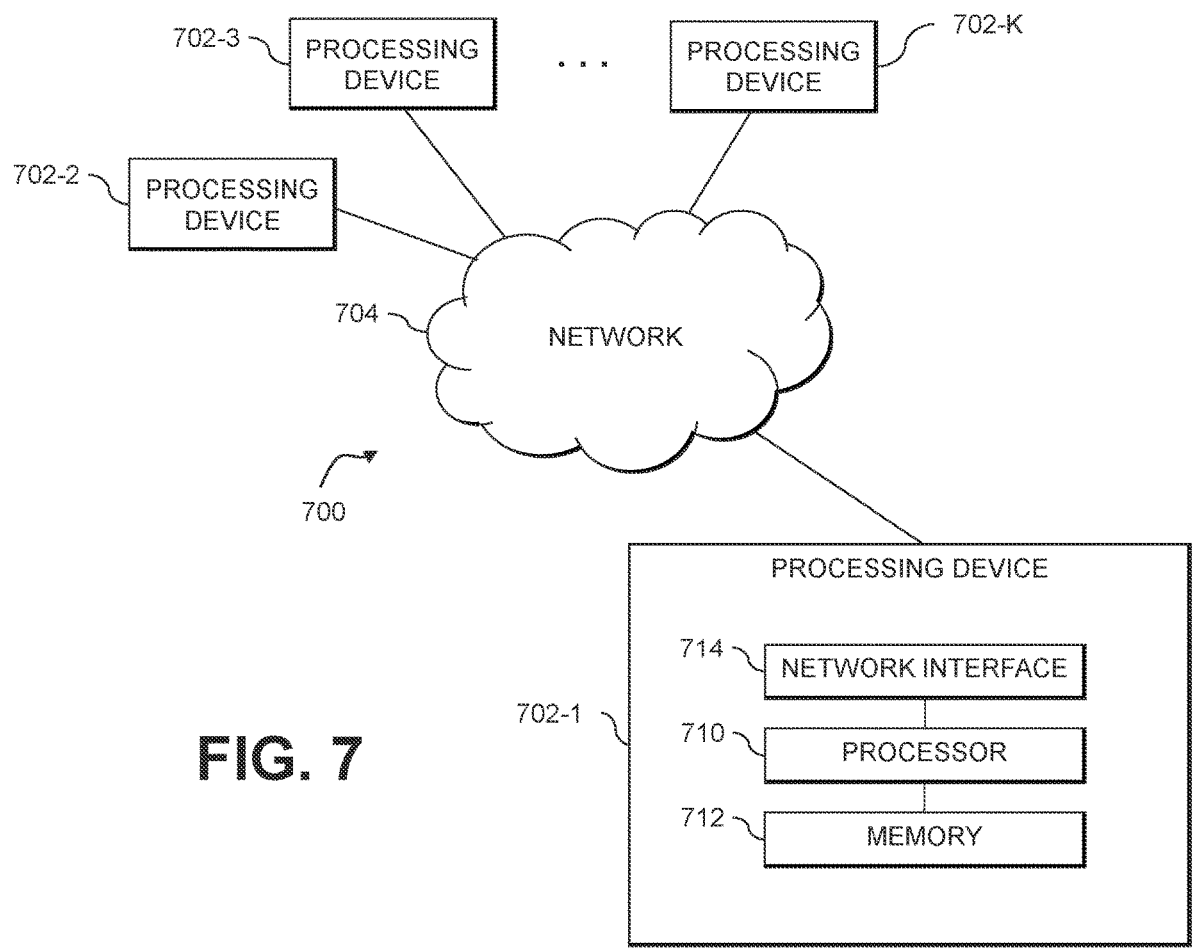

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for constructing and executing search queries with terms semantically similar to those of a search request as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, data sources, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to receive a search request submitted by a user, the search request being related to a specified event;
   to parse the search request to identify a set of confident terms in the search request having at least a threshold level of definiteness;
   to determine first and second subsets of the set of confident terms, the first subset of the set of confident terms comprising confident terms which indirectly reference the specified event, the second subset of the set of confident terms comprising confident terms not in the first subset of the set of confident terms;
   to identify, for at least a given one of the confident terms in the second subset, one or more terms having at least a threshold level of semantic similarity with the given confident term;
   to construct a primary search query and one or more additional search queries, the primary search query comprising the first and second subsets of the set of confident terms, the one or more additional search queries comprising the first subset of the set of confident terms and the identified one or more terms having at least the threshold level of semantic similarity with the given confident term;
   to execute the primary and one or more additional search queries to obtain a primary result set and one or more additional result sets; and
   to return a response to the search request for the user that submitted the search request, the response comprising at least a subset of results in the primary result set and at least a subset of results in the one or more additional result sets;
   wherein constructing the primary search query and the one or more additional search queries comprises converting at least one of the confident terms in the first subset of the set of confident terms into a fixed query by replacing (i) a first description of at least one of one or more times, one or more locations and one or more persons that the search request indicates is associated with the specified event with (ii) a second description of said at least one of the one or more times, the one or more locations and the one or more persons that the search request indicates is associated with the specified event, the second description providing a range of possible values derived for the user that submitted the search request from said at least one of the confident terms in the first subset of the set of confident terms.

2. The apparatus of claim 1 wherein parsing the search request to identify the set of confident terms in the search request comprises:
   identifying one or more vague terms in the search request, the one or more vague terms comprising uncountable or doubtful pronouns, verbs, nouns and adverbs; and
   identifying remaining terms in the search request as the set of confident terms.

3. The apparatus of claim 1 wherein the first subset of the set of confident terms which indirectly reference the specified event comprise at least one of:
   one or more location terms for the one or more locations associated with the specified event;
   one or more time terms for the one or more times associated with the specified event; and
   one or more person terms for the one or more persons associated with the specified event.

4. The apparatus of claim 1 wherein parsing the search request to identify the set of confident terms in the search request comprises utilizing a confident terms data store associated with the user that submitted the search request.

5. The apparatus of claim 4 wherein the confident terms data store is built through analyzing one or more social media data sources, one or more employment data sources, and one or more calendar data sources associated with the user that submitted the search request.

6. The apparatus of claim 4 wherein the confident terms data store is built through monitoring one or more chat logs of one or more chats involving the user that submitted the search request.

7. The apparatus of claim 1 wherein constructing the primary search query and the one or more additional search queries comprises converting said at least one confident term into the fixed query by looking up said at least one confident term in one or more knowledge systems associated with the user that submitted the search request.

8. The apparatus of claim 7 wherein the one or more knowledge systems comprises at least one of a social media network and an address book.

9. The apparatus of claim 7 wherein converting said at least one confident term into the fixed query comprises determining the range of possible values for said at least one confident term from information stored in the one or more knowledge systems associated with the user that submitted the search request.

10. The apparatus of claim 1 wherein identifying the one or more terms having at least the threshold level of semantic similarity with the given confident term comprises determining one or more synonyms for the given confident term in a word thesaurus data store.

11. The apparatus of claim 10 wherein the word thesaurus data store is built utilizing one or more thesaurus data sources and one or more disambiguation data sources.

12. The apparatus of claim 1 wherein identifying the one or more terms having at least the threshold level of semantic similarity with the given confident term comprises assigning a term ranking to each of the one or more terms having at least the threshold level of semantic similarity with the given confident term, the rankings characterizing a degree of closeness to the given confident term.

13. The apparatus of claim 12 wherein a given one of the one or more additional search queries is assigned an overall ranking based at least in part on a combined ranking of the identified one or more terms having at least the threshold level of semantic similarity with the given confident term which are included in the given additional search query.

14. The apparatus of claim 13 wherein the at least one processing device is further configured, responsive to detecting that the user that submitted the search request selects one or more of the results in a given one of the additional result sets corresponding to the given additional search query, to update at least one of (i) the overall ranking of the given additional search query and (ii) the term rankings of the identified one or more terms having at least the threshold level of semantic similarity with the given confident term which are included in the given additional search query.

15. A computer program product comprising a non-transitory processor-readable storage medium having stored therein program code of one or more software programs, wherein the program code when executed by at least one processing device causes the at least one processing device:

to receive a search request submitted by a user, the search request being related to a specified event;

to parse the search request to identify a set of confident terms in the search request having at least a threshold level of definiteness;

to determine first and second subsets of the set of confident terms, the first subset of the set of confident terms comprising confident terms which indirectly reference the specified event, the second subset of the set of confident terms comprising confident terms not in the first subset of the set of confident terms;

to identify, for at least a given one of the confident terms in the second subset, one or more terms having at least a threshold level of semantic similarity with the given confident term;

to construct a primary search query and one or more additional search queries, the primary search query comprising the first and second subsets of the set of confident terms, the one or more additional search queries comprising the first subset of the set of confident terms and the identified one or more terms having at least the threshold level of semantic similarity with the given confident term;

to execute the primary and one or more additional search queries to obtain a primary result set and one or more additional result sets; and to return a response to the search request for the user that submitted the search request, the response comprising at least a subset of results in the primary result set and at least a subset of results in the one or more additional result sets;

wherein constructing the primary search query and the one or more additional search queries comprises converting at least one of the confident terms in the first subset of the set of confident terms into a fixed query by replacing (i) a first description of at least one of one or more times, one or more locations and one or more persons that the search request indicates is associated with the specified event with (ii) a second description of said at least one of the one or more times, the one or more locations and the one or more persons that the search request indicates is associated with the specified event, the second description providing a range of possible values derived for the user that submitted the search request from said at least one of the confident terms in the first subset of the set of confident terms.

16. The computer program product of claim 15 wherein the first subset of the set of confident terms which indirectly reference the specified event comprise at least one of:

one or more location terms for the one or more locations associated with the specified event;

one or more time terms for the one or more times associated with the specified event; and one or more person terms for the one or more persons associated with the specified event.

17. The computer program product of claim 15 identifying the one or more terms having at least the threshold level of semantic similarity with the given confident term comprises determining one or more synonyms for the given confident term in a word thesaurus data store.

18. A method comprising:

receiving a search request submitted by a user, the search request being related to a specified event;

parsing the search request to identify a set of confident terms in the search request having at least a threshold level of definiteness;

determining first and second subsets of the set of confident terms, the first subset of the set of confident terms comprising confident terms which indirectly reference the specified event, the second subset of the set of confident terms comprising confident terms not in the first subset of the set of confident terms;

identifying, for at least a given one of the confident terms in the second subset, one or more terms having at least a threshold level of semantic similarity with the given confident term;

constructing a primary search query and one or more additional search queries, the primary search query comprising the first and second subsets of the set of confident terms, the one or more additional search queries comprising the first subset of the set of confident terms and the identified one or more terms having at least the threshold level of semantic similarity with the given confident term;

executing the primary and one or more additional search queries to obtain a primary result set and one or more additional result sets; and returning a response to the search request for the user that submitted the search request, the response comprising at least a subset of results in the primary result set and at least a subset of results in the one or more additional result sets;

wherein constructing the primary search query and the one or more additional search queries comprises converting at least one of the confident terms in the first subset of the set of confident terms into a fixed query by replacing (i) a first description of at least one of one or more times, one or more locations and one or more persons that the search request indicates is associated with the specified event with (ii) a second description of said at least one of the one or more times, the one or more locations and the one or more persons that the search request indicates is associated with the specified event, the second description providing a range of possible values derived for the user that submitted the search request from said at least one of the confident terms in the first subset of the set of confident terms; and wherein the method is performed by at least one processing device comprising a processor coupled to a memory.

19. The method of claim 18 wherein the first subset of the set of confident terms which indirectly reference the specified event comprise at least one of:

one or more location terms for the one or more locations associated with the specified event;

one or more time terms for the one or more times associated with the specified event; and one or more person terms for the one or more persons associated with the specified event.

20. The method of claim 18 identifying the one or more terms having at least the threshold level of semantic similarity with the given confident term comprises determining one or more synonyms for the given confident term in a word thesaurus data store.

\* \* \* \* \*